United States Patent [19]

DiMaio

[11] Patent Number: 5,587,439
[45] Date of Patent: Dec. 24, 1996

[54] POLYMER SUPPORTED CATALYST FOR OLEFIN POLYMERIZATION

[75] Inventor: Anthony-J. DiMaio, Maineville, Ohio

[73] Assignee: Quantum Chemical Corporation, Cincinnati, Ohio

[21] Appl. No.: 439,810

[22] Filed: May 12, 1995

[51] Int. Cl.$^6$ .................. C08F 4/629; C08F 4/637; C08F 10/00
[52] U.S. Cl. .................. 526/142; 502/8; 502/109; 502/114; 502/119; 502/121; 502/122; 502/124; 502/127; 502/128; 526/132; 526/943; 526/904
[58] Field of Search .................. 502/109, 127, 502/8, 114, 119, 121, 122, 124, 125, 127; 526/142

[56] References Cited

U.S. PATENT DOCUMENTS

| | | |
|---|---|---|
| 3,422,049 | 1/1969 | McClain .................. 526/331 |
| 4,147,664 | 4/1979 | Pomogailo et al. . |
| 4,921,825 | 5/1990 | Kioka et al. . |
| 5,206,199 | 4/1993 | Kioka et al. . |
| 5,292,840 | 3/1994 | Heilmann et al. . |
| 5,331,071 | 7/1994 | Kataoka et al. . |
| 5,336,742 | 8/1994 | Heilmann et al. . |
| 5,346,925 | 9/1994 | Sugano et al. . |
| 5,492,985 | 2/1996 | Peifer et al. .................. 526/160 |

FOREIGN PATENT DOCUMENTS

| | | |
|---|---|---|
| 2093056 | 10/1993 | Canada . |
| 285443 | 10/1988 | European Pat. Off. . |
| 295312 | 12/1988 | European Pat. Off. . |
| 522581 | 1/1993 | European Pat. Off. . |
| 563917 | 10/1993 | European Pat. Off. . |
| 6-56928 | 3/1994 | Japan . |

OTHER PUBLICATIONS

Japanese Kokai Patent application No. Hei 6[1994]–56928).
Dyachkowvskii et al., "Synthesis and Catalytic Properties of Transition–Metal Complexes Immobilized on Macroolecular Support in Polymerization Processes", *J. Polymer Science: Polymer Symposium,* 68, pp. 97–108 (1980).

*Primary Examiner*—Edward J. Smith
*Attorney, Agent, or Firm*—Gerald A. Baracka; William A. Heidrich

[57] ABSTRACT

The present invention is directed to a supported metallocene catalyst useful in the polymerization of α-olefins which is obtained by tethering a metallocene catalyst component to the surface of a particulate, functionalized copolymeric support material.

40 Claims, No Drawings

POLYMER SUPPORTED CATALYST FOR OLEFIN POLYMERIZATION

FIELD OF THE INVENTION

The present invention relates to a supported metallocene catalyst useful for polymerizing or copolymerizing α-olefins. More particularly, the instant invention is directed to a supported metallocene catalyst which is prepared by tethering a metallocene catalyst component to a functionalized copolymeric support material. The instant invention also relates to a process for polymerizing or copolymerizing α-olefins using the supported metallocene catalysts of the present invention.

BACKGROUND OF THE INVENTION

Traditionally, ethylene and 1-olefins have been polymerized or copolymerized in the presence of hydrocarbon insoluble catalyst systems which comprise a transition metal component and an aluminum alkyl. More recently, active homogeneous catalyst systems comprising a bis(cyclopentadienyl)-transition metal dialkyl, an aluminum alkyl, and water have been found to be useful for the polymerization of ethylene. Such catalyst systems containing a cyclopentadienyl moiety are referred to in the art as "metallocenes".

U.S. Pat. Nos. 4,404,344; 4,522,982; 4,590,914 and 4,937,299 describe various homogeneous metallocene catalyst systems for use in α-olefin polymerization reactions. These metallocene catalyst systems typically require the use of an aluminoxane compound as a catalyst activator.

An advantage of the metallocene aluminoxane homogeneous catalyst system is the very high activity obtained for ethylene polymerization. Another significant advantage is, unlike olefin polymers produced in the presence of conventional heterogeneous Ziegler catalysts, terminal unsaturation is present in polymers produced in the presence of these homogeneous catalysts. Nevertheless, the homogeneous metallocene catalysts suffer from a disadvantage, that is, the ratio of alumoxane to metallocene is high, for example, in the order of 1,000 to 1 or greater. Such voluminous amounts of alumoxane would require extensive treatment of polymer product obtained in order to remove the undesirable aluminum. A second disadvantage of the homogeneous catalyst system, a disadvantage also associated with traditional heterogeneous Ziegler catalysts, is the multiple delivery systems required for introducing the individual catalyst components into the polymerization reactor.

In an attempt to overcome these problems mentioned hereinabove, supported-heterogeneous metallocene catalyst systems have been developed. Typically, the heterogeneous metallocene catalyst system comprises supporting a metallocene catalyst component on refractory inorganic oxide supports, such as $SiO_2$, $Al_2O_3$ and MgO. These inorganic oxide supports, which may be used in concert with an organoaluminum compound, are available in a variety of particle sizes and porosities. One such heterogeneous catalyst system using a refractory oxide support is described in U.S. Pat. No. 5,086,025 to Chang. More specifically, the Chang reference discloses a process for preparing a supported metallocene alumoxane catalyst for use in liquid or slurry phase polymerization of α-olefins. The preparation of the supported heterogeneous catalyst involves initially reacting silica gel with an aluminum trialkyl solution to form a support material for the metallocene component. The metallocene component is then adsorbed onto the surface of the support material.

Despite their usefulness, inorganic oxide supports have several deficiencies. For example, inorganic oxide supports must be calcined at high temperatures or chemically treated with appropriate reagents to remove physically adsorbed water from the surface of the support. The presence of water on the surface of inorganic oxide supports is well known in the art as being a catalytic poison which can adversely affect the catalytic activity of the catalyst.

In addition, inorganic oxide supports have a limited maximum pore size which also can restrict the catalytic performance of the catalyst. Although large pore size inorganic oxides are available, these materials may be friable and the use thereof as catalyst supports may, through attrition, lead to the formation of unwanted fine particles.

Furthermore, it is well known in the art that inorganic oxides not only adsorb water but other commonly occurring catalyst poisons, such as oxygen. Thus, great care in handling and preparing inorganic oxide supported catalysts must always be exercised.

Moreover, since prior art supported metallocene catalysts involve adsorption of the metallocene onto the inorganic oxide support, a debate exists as to whether the metallocene component is actually bound to the surface of the inorganic oxide support or is held in place as a contact ion pair in conjunction with the surface bound organometallic species. If the former is the case, the bound complex may have been the result of chloride or ligand abstraction, or the surface oxygen from the support may have been bound to the transition metal. If the latter is true, the possibility of active site migration, redistribution, and bimolecular deactivation becomes more reasonable during polymerization. All of these phenomena may contribute towards poor morphological control or less than optimal catalyst performance.

To overcome the above deficiencies that are commonly observed in inorganic supported catalysts and to provide a metallocene catalyst which maintains its basic ligand environment and oxidation state, many research groups have focused on substituting polymeric supports for inorganic oxide supports. See, for example, U.S. Pat. Nos. 4,147,644; 5,206,199; and 5,346,925; European Patent Appln. Nos. 598,543; 285,443 and 295,312; and Canadian Patent Appln. No. 2,093,056.

Another example of supporting a metallocene catalyst component on a polymeric support is disclosed in Japanese Kokai Patent Appln. No. Hei 6-56928 (1994). The supported metallocene catalyst disclosed in this Japanese reference is prepared by reacting a ligand leader of a transition metal component having halogen atoms or an OR group, wherein R is a $C_1$–$C_{16}$ hydrocarbon, with an organometallic compound containing a metal from Groups I–III of the Periodic Table of Elements. Next, the polymeric support material having a substitute group, such as a halogen atom, an ester group, a carboxyl group or a hydroxy group, is reacted and the ligand is chemically bonded to the polymeric support. The transition-metal compound precursor obtained above is then coordinated to the ligand chemically bonded to the polymeric support material.

Typically, polymeric supports employed in the prior art are organic polymers such as polyethylene, polypropylene, polystyrene, polyvinyl alcohol, poly(styrene-divinylbenzene), poly(methylmethacrylate) and the like.

The use of these polymeric supports provides several advantages over similar olefin metallocene polymerization catalyst components supported upon inorganic oxides. For example, polymeric supports usually require no dehydration prior to the use thereof; they can be easily functionalized which afford more opportunities to prepare tailor-made catalysts; they are inert; they can be prepared with a wide range of physical properties, via chemical and mechanical means to intentionally give porosity, morphology and size control to the catalyst; and they offer a cost advantage over inorganic oxide supports.

Despite the advantages listed hereinabove, prior art polymeric supports still possess certain inherent disadvantages which decrease their acceptability as viable replacements for inorganic oxide supports. For instance, polymeric supports often lack structural stability at high temperatures and under some solvent conditions. Moreover, the porosity and size of the polymeric support, due to swelling may change drastically over the short time duration required to prepare the catalyst. Furthermore, the choice of the polymer support must be compatible with the polymer produced in order to insure that this incompatibility does not contribute to the formation of gels.

It would thus be highly advantageous to provide a polymeric support which keeps the active site of the metallocene intact and which overcomes the above drawbacks while still being useful in the polymerization of α-olefins.

SUMMARY OF THE INVENTION

The present invention is directed to a supported metallocene catalyst that is useful in the homopolymerization or copolymerization of α-olefins which is prepared by tethering a metallocene catalyst component to a particulate functionalized copolymeric support material. More specifically, the supported metallocene catalyst of the instant invention is prepared by tethering a metallocene to a particulate functionalized copolymeric support through a bridge to the cyclopentadienyl, indenyl or fluorenyl ring. The particulate functionalized copolymeric supports of the instant invention include copolymers of an α-olefin and an acrylate, the latter being used in a generic sense to include esters of acrylic as well as methacrylic acid. The supported metallocene catalyst of the instant invention, in combination with suitable cocatalysts, provides an α-olefin polymerization catalyst system which produces polymers comprised predominantly of ethylene and/or propylene with densities ranging from about 0.90 to about 0.97 and having a desirable balance of rheological and physical properties making them useful in a wide range of applications.

In accordance with a preferred embodiment of the present invention, the particulate functionalized copolymeric support is a microfine powder comprised of particles that are spherical or substantially spherical. The term "microfine" means that the particles of the support material have a median particle size of from about 1 to about 500 microns. The microfine powders which are employed in the present invention are prepared by heating a copolymer to a temperature above the melting point of the copolymer in the presence of a nonionic surfactant; dispersing the mixture produced in the heating step in a dispersant to produce droplets of a desired size; and cooling the dispersion to a temperature below the melting point of the copolymer.

In another aspect of the present invention, a process for polymerizing one or more α-olefins is provided. In this process at least one α-olefin is polymerized under olefin polymerization conditions utilizing the catalyst system of the present invention which includes the tethered metallocene as the solid catalyst component, along with a suitable cocatalyst component(s).

DETAILED DESCRIPTION OF THE INVENTION

The particulate functionalized copolymeric supports of the instant invention are copolymers of an α-olefin and an acrylate. The term "acrylate" being used in the generic sense to encompass esters of both acrylic and methacrylic acid.

The copolymers, from which the particulate functionalized supports of the present invention are obtained, are produced by copolymerizing an α-olefin, especially ethylene and/or propylene, with one or more monomers selected from the group consisting of lower alkyl acrylates, arylacrylates and methacrylate monomers or by grafting one or more of the aforementioned acrylate monomers to a polyolefin, particularly a polypropylene or polyethylene, backbone.

Copolymerizations of α-olefins and the above monomers are well known and are generally carried out at pressures of up to about 30,000 psi and temperatures of from about 150° C. to about 250° C. in the presence of suitable catalysts. A typical process for copolymerizing ethylene and lower alkyl acrylates is described in U.S. Pat. No. 2,200,429, the contents of which are incorporated herein by reference.

Grafting of the above acrylate monomers onto a polyolefin backbone may be conducted by using techniques that are well known in the art. Typical grafting processes that may be used in the present invention to graft the acrylate monomer to a polyolefin backbone are described in U.S. Pat. Nos. 2,987,501; 3,027,346 and 3,882,194, the contents of which are incorporated by reference.

The above-mentioned copolymers have an α-olefin as the major constituent. More preferably, the copolymers of the invention have from about 50.1 to about 99.9 weight percent $C_{2-3}$ α-olefin copolymerized with from about 0.1 to about 49.9 weight percent of the monomer. Preferably, the copolymers will contain from about 70 to about 99 weight percent ethylene, propylene or mixtures thereof and from about 1 to about 30 weight percent of one of the above-identified monomers. In one highly useful embodiment, the copolymer supports comprise from about 80 to about 95 weight percent ethylene and about 5 to about 20 weight percent acrylate.

The acrylate monomer utilized in the present invention has the formula

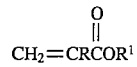

where R is hydrogen or methyl and $R^1$ is an alkyl group having from about 1 to about 12 carbon atoms or an aryl group having from about 6 to about 12 carbon atoms. Alkyl groups may be straight chain or branched and can be saturated or unsaturated. Aryl groups can be unsubstituted, e.g., phenyl, or can contain one or more hydrocarbyl substituents, e.g., benzyl, tolyl, xylyl.

Representative acrylate comonomers which can be used for the copolymer include: methyl acrylate, ethyl acrylate, isopropyl acrylate, allyl acrylate, n-butyl acrylate, t-butyl acrylate, neopentyl acrylate, n-hexyl acrylate, cyclohexyl acrylate, benzyl acrylate, phenyl acrylate, tolyl acrylate, xylyl acrylate, 2-ethylhexyl acrylate, 2-phenylethyl acrylate, n-decyl acrylate, isobornyl acrylate, n-octadecyl acrylate, methyl methacrylate, ethyl methacrylate, propyl methacrylate, n-butyl methacrylate, sec-butyl methacrylate, n-pentyl methacrylate, n-hexyl methacrylate, n-octyl methacrylate, isooctyl methacrylate, isodecyl methacrylate, lauryl methacrylate and the like.

Among the preferred acrylate comonomers, alkyl acrylate comonomers having the above structural formula where R is hydrogen and $R^1$ is a $C_{1-4}$ alkyl group are particularly useful. Of these, methyl acrylate, ethyl acrylate and n-butyl acrylate are especially preferred.

In a highly useful embodiment of the invention, the particulate supports are ethylene-methyl acrylate, ethylene-ethyl acrylate and ethylene-n-butyl acrylate copolymers. An ethylene-methyl acrylate particulate support is particularly preferred.

The melt index of the copolymers can range from about 0.1 up to about 400 g/10 min. or above. However, in a preferred embodiment where the supports are microfine powders comprised of particles which are spheroidal or substantially spheroidal, the melt index is in the range of from about 1 up to about 125, and more preferably, from about 1 up to about 60. All melt indexes referred to herein are determined at 190° C. in accordance with ASTM D 1238, Condition E, and are expressed in grams per 10 minutes.

The copolymers used to form the supported metallocene catalysts of the invention are particulate products comprised of discrete particles whose median particle size can range from about 1 up to about 1500 microns, and more preferably, from about 1 to about 1000 microns. Moreover, the particulate support material of the present invention is further characterized as having a pore volume of less than about 0.1 cc/g and a surface area which is less than about 15 $m^2/g$.

The copolymer powders can be obtained by spray drying or the copolymer can be precipitated from solution by the addition of a suitable precipitating agent, e.g., methanol. The particulate supports obtained by spray drying the copolymer or copolymers may also be ground or milled to produce powders within the acceptable size range. Mechanical grinding may be carried out under ambient conditions if the copolymer has a sufficiently high melting point and does not degrade under the grinding conditions; however, it is more customary to cryogenically grind the copolymers. After grinding, the powders can be sieved to recover particles of the desired size and particle size distribution. Suitable particulate supports can also be produced using other conventional solution and dispersion processes.

In a particularly useful embodiment of the invention, the supports are "microfine" powders of functionalized copolymers obtained by dispersion processes. Particles produced by these processes are spheroidal or substantially spheroidal in shape. Microfine powders produced using dispersion processes, in addition to being spheroidally shaped particles, also have substantially narrower particle size distributions than reactor powders or powders produced by precipitation, grinding or milling.

Preferred microfine functionalized copolymeric supports are comprised of discrete particles which are spheroidally or substantially spheroidally shaped and have a median particle size (diameter) of from about 1 micron to about 500 microns. More preferably, the median particle size is from about 5 microns to about 300 microns and in an especially useful embodiment the median particle size is from about 20 to about 200 microns. Median diameters as used herein are obtained from the particle volume distribution curve.

The copolymers of the present invention are converted to microfine powders using the dispersion technique of U.S. Pat. Nos. 3,422,049, 3,432,483 and 3,746,681, details of which are incorporated herein by reference. In the powder-forming operation, the copolymer is charged to the reactor with a polar liquid medium and nonionic surfactant and a dispersion is formed in accordance with conventional dispersing procedures described in the art. The dispersing apparatus may be any device capable of delivering sufficient shearing action to the mixture at elevated temperature and pressure. Conventional propeller stirrers designed to impart high shear can be used for this purpose. The vessel may also be equipped with baffles to assist in dispersing the copolymer. Particle size and particle size distribution will vary depending on the shearing action which, in turn, is related to the stirrer design and rate of stirring. Agitation rates can vary over wide limits but the speed of the stirrer will usually be controlled so that the tip speed is between about 400 and about 4000 ft/min and, more commonly, about 800 and about 3500 ft/min. Higher tip speeds are generally used for batch operation, usually about 2500–3500 ft/min. Tip speeds for continuous procedures most generally range between about 800 and about 3000 ft/min.

The dispersion process is typically carried out in a vessel which enables the powder-forming process to be conducted at elevated temperature and pressure. In the usual batch process, all of the ingredients are charged to the vessel and the mixture is heated to a temperature above the melt point of the copolymer. While the temperature will vary depending on the specific polymer being used, it will typically range from about 175° C. to about 250° C. Since the fluidity of polymers is temperature related, it may be desirable to carry out the process at temperatures substantially above the melt point of the copolymer to facilitate formation of the dispersion; however, the temperature should not exceed the thermal degradation temperature of the polymer.

Stirring is commenced after the desired temperature is reached and continued until a dispersion of the desired droplet size is produced. This will vary depending on the particular copolymer being used, temperature, amount and type of surfactant, and other process variables, but generally will range from about 5 minutes to about 2 hours. Stirring is most commonly maintained for a period of from about 10 to about 30 minutes.

A polar liquid medium which is not a solvent for the copolymer is employed as the dispersant in the formation of the microfine powder support. These polar media are hydroxylic compounds and can include water, alcohols, polyols and mixtures thereof. The weight ratio of polar liquid medium to polymer ranges from about 0.8:1 to about 9:1 and, more preferably, from about 1:1 to about 5:1. It is particularly advantageous to use water as the dispersing medium or a liquid medium where water is the major component.

The pressure of the process is not critical so long as a liquid phase is maintained. In general, the pressure can range from about 1 up to about 250 atmospheres. The process can be conducted at autogenous pressure or the pressure can be adjusted to exceed the vapor pressure of the liquid medium at the operating temperature. Most generally, with aqueous dispersions, the pressure will range from about 5 to about 120 atmospheres.

To form acceptable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to about 50 percent, based on the weight of the copolymer. Most preferably, the nonionic surfactant is present in a concentration of from about 7 to about 45 percent, based on the weight of the copolymer.

Useful nonionic surface active agents of the above type are manufactured and sold by BASF Corporation, Chemicals Division under the trademark Pluronic. These products are obtained by polymerizing ethylene oxide onto the ends of a preformed polyoxypropylic base. Both the molecular weight of the polyoxypropylene base and the polyoxyethylene segments can be varied to yield a wide variety of products. One such compound found to be suitable in the practice of the process of this invention is the product designated as F-98 wherein a polyoxypropylene of average molecular weight of 2,700 is polymerized with ethylene oxide to give a product of molecular weight averaging about 13,500. This product contains 20 weight percent propylene oxide and 80 weight percent ethylene oxide. Other effective Pluronic® surfactants include F-88 (M.W. 11,250, 20% propylene oxide, 80%. ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least 4,500, are highly effective as dispersing agents for the aforementioned copolymers.

It is also possible to employ products sold under the trademark Tetronic which are prepared by building propylene oxide block copolymer chains onto an ethylenediamine nucleus and then polymerizing with ethylene oxide. Tetronic® 707 and Tetronic® 908 are most effective for the present purposes. Tetronic® 707 has a 30 weight percent polyoxypropylene portion of 2,700 molecular weight polymerized with a 70 weight percent oxyethylene portion to give an overall molecular weight of 12,000. Tetronic® 908, on the other hand, has a 20 weight percent polyoxypropylene portion of 2,900 molecular weight polymerized with an 80 weight percent oxyethylene portion to give an overall molecular weight of 27,000. In general, useful Tetronic® surfactants have molecular weights above 10,000 and contain a major portion by weight of ethylene oxide.

The powder-forming process may also be conducted in a continuous manner. If continuous operation is employed, the ingredients are continuously introduced to the system while removing the dispersion from another part of the system. The ingredients may be separately charged or may be combined for introduction to the autoclave.

The particulate copolymer supports and especially the microfine spheroidal powders described hereinabove are then used to prepare the supported metallocene catalysts of the instant invention.

In accordance with the present invention, the particulate copolymer is reacted with a metallated compound under conditions sufficient to form a metallated keto intermediate and an associate alcohol.

The metallated compounds employed in the present invention are well known to those skilled in the art and they include substituted or unsubstituted cyclopentadienylide, indenylide or fluorenylide compounds which contain a metal from Groups I–III of the Periodic Table of Elements. Illustrated examples of such compounds include, but are not limited to, sodium cyclopentadienylide, lithium cyclopentadienylide, potassium cyclopentadienylide, cyclopentadienylthallium, sodium pentamethyl cyclopentadienylide, lithium pentamethyl cyclopentadienylide, bis-(cyclopentadienyl) magnesium, bis-(cyclopentadienyl) calcium, sodium indenylide, lithium indenylide, sodium fluorenylide, lithium fluorenylide and the like. Of these metallated compounds, the cyclopentadienylide compounds are particularly preferred. Sodium cyclopentadienylide is the most preferred metallated compound employed in the present invention.

Typically in the present invention, from about 0.001 to about 10 mmol of metallized compound per gram of particulate copolymeric support is employed. This may mean that there is an excess amount of a metallated compound present relative to the amount of functional groups present on the copolymeric support. The maximum amount of metallated compound is determined by the number of functional groups present on the copolymer support. More preferably, from about 0.01 to about 2 mmol metallated compound per gram of particulate support is employed in foregoing reaction step.

The above reaction of the particulate copolymer support and the metallated compound is carried out in an inert atmosphere, such as $N_2$ or Ar, and in the presence of an ether solvent such as tetrahydrofuran (THF), dimethyl ether, diethyl ether, di-n-propyl ether, diisopropyl ether, di-n-butyl ether, divinyl ether, diallyl ether, diphenyl ether, 1,4-dioxane, dimethoxyethane and the like. In a preferred embodiment of the present invention, the foregoing reaction is carried out in a $N_2$ atmosphere, and THF is used as the solvent. Solvents such as toluene, benzene and xylene are also contemplated in the present invention.

The aforementioned reaction of the particulate copolymer support and the metallated compound is conducted at a temperature of from about 0° to about 100° C. for a period of time from about one hour to about five days. More preferably, the above reaction is conducted at a temperature of from about 15° to about 75° C. for a period of time from about one day to about four days. Most preferably, the above reaction which results in the formation of the metallated keto-intermediate is conducted at a temperature of from about 20° C. to about 30° C. for up to about three days.

All or a portion of the solvent may be removed after this reaction and the intermediate product produced may be washed, if desired. While it is not necessary, it is possible to wash and/or dry the intermediate product before contacting with the transition metal compound. Polymeric resins of high bulk density may be produced using catalysts which have been prepared without washing between contacting steps. If all or part of the solvent is removed from the intermediate product, it will be redispersed in fresh solvent prior to contacting with the transition metal compound.

The metallated keto intermediate is then contacted with a transition metal compound under conditions sufficient to bind the transition metal to the cyclopentadienyl, indenyl or fluorenyl ring which is bound through the keto-bridge to the particulate copolymer support material. This reaction provides the tethered metallocene solid catalyst composition of the instant invention.

Suitable transition metal compounds that are employed in the present invention are represent by general formula $$(Cp)_a MR''_b X_c$$

wherein Cp is a substituted or unsubstituted cyclopentadienyl, indenyl or fluorenyl ring; M is a metal from Group IVB, VB or VIB of the Periodic Table of Elements; R" is a hydride, a hydrocarbyl group having from about 1 to about 20 carbon atoms, an alkoxy group having from about 1 to about 12 carbon atoms, a substituted or unsubstituted aryl group containing from about 6 to about 12 carbon atoms, or NR''', wherein R''' is an alkyl containing from about 1 to about 12 carbon atoms; X is a halide; a is a 0 or 1; b is 0–4; c is 0–4; and the sum of a, b and c is equal to the oxidation state of M.

Exemplary hydrocarbyl radicals are methyl, ethyl, propyl, butyl, acyl, isoamyl, hexyl, isobutyl, heptyl, octyl, nonyl, decyl, cetyl, 2-ethylhexyl, phenyl and the like.

Exemplary alkoxys are methoxy, ethoxy, propoxy, butoxy and the like. Of these, methoxy is most particularly preferred.

Exemplary halides include chloride, bromide, fluoride and iodide. Of these, chloride is most particularly preferred.

Suitable transition metal compounds that encompass the above formula include, but are not limited to, titanium trichloride, titanium tetrachloride, zirconium tetrachloride, hafnium tetrachloride, (cyclopentadienyl)titanium trichloride, (cyclopentadienyl)zirconium trichloride, (cyclopentadienyl)hafnium trichloride, zirconium tetramethyl, zirconium tetramethoxy, zirconium tetraethoxy, titanium tetramethyl, titanium tetramethoxy, titanium tetraethoxy, (cyclopentadienyl)zirconium tribromide, (cyclopentadienyl)zirconium trimethyl, (cyclopentadienyl)zirconium triphenyl, (cyclopentadienyl)zirconium trimethoxy, zirconium tetra((dimethyl)amide), zirconium tetra((diethyl)amide), cyclopentadienyl zirconium dimethylamide dichloride and the like.

Of these transition metal compounds, zirconium compounds are particularly preferred. The most preferred zirconium compounds are zirconium tetrachloride and cyclopentadienyl zirconium trichloride. It should be noted that the transition metal compounds may be associated with a suitable solvent. An example of such a compound is $ZrCl_4(THF)_2$ where tetrahydrofuran is utilized as the solvent.

The above reaction is carried out in the presence of a solvent mentioned hereinabove under an inert gas atmosphere. Moreover, the reaction is conducted at a temperature of from about 0° C. to about 100° C. for a period of time up to about five days. More preferably, the reaction of the intermediate compound and the transition metal compound is carried out at a temperature of from about 15° C. to about 75° C. for a period of about 30 minutes to about two days. Most preferably, the reaction is conducted at a temperature of from about 20° C. to about 30° C. for a period of time up to about 24 hours.

While it is not necessary, the supported metallocene catalyst of the present invention may be washed and dried after recovery. After the transition metal is reacted with the intermediate compound, the supported metallocene catalyst is recovered using conventional procedures, such as decantation and centrifugation, and is ready for use in polymerizations.

Supported metallocene catalysts obtained in this manner are fine, free-flowing powders having particles not differing substantially in size, shape and particle size distribution from that of the copolymer support material used for their preparation. The supported metallocene catalysts of the instant invention contain from about 0.01 up to about 10 weight percent transition metal based on the total weight of said supported catalyst. More typically, transition metal contents will range from about 0.1 to about 2.0. The supported metallocene catalysts of this invention are generally employed with a cocatalyst, sometimes also referred to as a catalyst promoter or catalyst activator. The cocatalyst employed in the present invention contains at least one metal selected from Groups IA, IIA, IIB, IIIB, and IVB of the Periodic Table of Elements. Such cocatalysts are known and widely used in the polymerization art and can include metal alkyls, metal hydrides, metal alkylhydrides, and metal alkylhalides, such as alkyllithium compounds, dialkylzinc compounds, trialkylboron compounds, trialkylaluminum compounds, alkylaluminum halides, alkylaluminum hydrides, and the like. Mixtures of cocatalytic agents can also be employed. Illustrative organometallic compounds which can be used as cocatalyst include n-butyllithium, diethylzinc, di-n-propylzinc, triethylboron, trimethylaluminum, triethylaluminum, triisobutylaluminum, tri-n-hexylaluminum, ethylaluminum dichloride, ethylaluminum dibromide, ethylaluminum dihydride, diethylaluminum chloride, di-n-propylaluminum chloride, and the like. Linear or cyclic aluminoxanes, which are preferred, such as those described in U.S. Pat. Nos. 4,897,455 to Wellborn, Jr. and 4,912,075 to Chang and dimeric compounds of the formula $(Y)_2$—Al—O—Al—$(Y)_2$ where each Y is the same or different and is an alkyl containing from about 1 to about 6, preferably from about 2 to about 4, carbon atoms can also be used as the cocatalyst. Preferred cocatalysts are the linear or cyclic aluminoxanes and the dimeric aluminum compounds described above. Methylaluminoxanes (MAO) are highly useful cocatalysts for the supported metallocene catalysts of the invention and is particularly preferred.

Cocatalysts are employed in amounts effective to promote (increase) the polymerization activity of the supported metallocene catalyst. The amount of cocatalyst used can vary widely but most generally the molar ratio of the metal of the cocatalyst, based on the transition metal compound, ranges from about 1:1 to about 10,000:1 and, more preferably, from about 50:1 to about 5,000:1. The catalyst may be activated in-situ by adding the cocatalyst and supported catalyst separately to the polymerization or the supported catalyst and activator may be pre-contacted before introduction to the polymerization reactor.

Cocatalysts for polymerization may be employed singly in the manner described, or in concert with other such modifiers, activators or promoters to enhance activity or influence resin properties. The use of cocatalyst modifiers is described, e.g. in U.S. Pat. No. 5,334,567 to Menon et al. regarding halosilanes; U.S. Pat. Nos. 4,559,318 to Smith et al., 4,866,021 to Miro et al., 5,006,618 to Miro et al. regarding halocarbons; U.S. Pat. No. 4,250,287 to Matlack regarding aromatic esters; U.S. Pat. Nos. 3,786,032 to Jennings et al. and 4,611,038 to Brun et al. regarding additional organometallic activators, and U.S. Pat. No. 5,275,991 to Buehler et al. regarding alkoxysilanes.

Preferred compounds which may be employed as cocatalyst modifiers include halocarbons such as carbon tetrachloride, carbon tetrabromide, dichloromethane, dibromomethane, 1,1,1-trichloroethane and a number of commonly available chlorofluorocarbons (CFC's) and hydro-chlorofluoracarbons (HCFC's); halosilanes such as silicon tetrachloride, trichlorosilane, dichlorosilane; and alkoxysilanes such as dimethoxysilane, diethoxysilane, diisopropoxysilane, trimethoxysilane and tetramethoxysilane.

A highly preferred class of cocatalyst modifiers that may be used in the present invention are the phenylborate salts. This class of cocatalyst modifier is well known to those skilled in this art. Suitable examples of such modifiers include, but are not limited to, triethylammonium tetraphenylborate, tri(n-butyl)ammonium tetraphenylborate, trimethylammonium tetraphenylborate, dimethyldiphenylammonium tetraphenylborate, methylpyridinium tetraphenylborate, benzylpyridinium tetraphenylborate, trimethylsulfonium tetraphenylborate, triethylammonium tetrakis(pentafluorophenyl) borate, triphenylammonium tetrakis(pentafluorophenyl) borate, methyldiphenylammonium tetrakis(pentafluorophenyl) borate, anilinium tetrakis(pentafluorophenyl) borate, methylanilinium tetrakis(pentafluorophenyl) borate, dimethyl(m-nitroanilinium tetrakis(pentafluorophenyl) borate, pyridinium tetrakis(pentafluorophenyl) borate, N-methylpyridinium tetrakis(pentafluorophenyl) borate, trimethylsulfonium tetrakis(pentafluorophenyl) borate, tetraphenylphosphonium tetrakis(pentafluorophenyl) borate, triphenylphosphonium tetrakis(pentafluorophenyl) borate, hexafluoroarsenic acid triethylammonium and the like.

The catalyst of the invention can be used in virtually any polymerization procedure where supported metallocene catalysts have heretofore been utilized. This includes both gas phase (stirred or fluidized bed) polymerizations and solution polymerizations. They are highly effective for stirred bed and fluidized bed polymerization processes which are carried out in the substantial absence of a liquid reaction medium. Such procedures are well known and described in the prior art and may be conducted in a single reactor or in multiple reactors connected in series. The catalysts are equally effective for use in particle form (slurry) processes which are also described in the prior art. These polymerizations are carried out in a liquid organic medium in which the catalyst is suspended. A pressure sufficient to maintain the organic diluent and at least a portion of the monomer in the liquid phase is maintained.

The supported metallocene catalysts of the invention are useful for the preparation of homopolymers and copolymers of alpha-olefins containing from about 2 to about 8 carbon atoms. Most preferably, they are used to produce polymers comprised predominantly of ethylene and/or propylene with densities ranging from about 0.90 to about 0.97 and having a desirable balance of rheological and physical properties making such polymers useful in applications such as blow molding, injection molding, rotomolding, rotolining, extrusion, coextrusion, film forming and the like.

Moreover, the polymers produced herein have the same morphology as the supported catalyst used in the polymerization process. That is, the polymers produced by the instant process have substantially spherical particles and a median particle size which depends on both the median particle size of the catalyst particles and the amount of polymer produced per unit amount of catalyst employed in the polymerization. The median particle size can thus range from about 10 to about 5000 microns. Prepolymerization methods may be used to further improve upon the particle size of the polymer produced. Such prepolymerization methods are well known to those skilled in the art. Furthermore, the polymer particles produced in the present invention are compatible with the functionalized copolymeric supports. Thus, no residual gels are formed during the polymerization process which are attributable to the catalyst support.

The following examples are given to illustrate the scope of the invention. As will be apparent to those skilled in the art, numerous variations are possible and thus the scope of this invention should not be limited thereto.

PREPARATION OF PARTICULATE SUPPORTS

An electrically heated two-liter Parr [trademark] pressure autoclave equipped with a thermowell and thermocouple connected to a digital display was used to prepare an ethylene-methyl acrylate copolymer (EMA) microfine powder support following the general procedure set forth in the U.S. Pat. No. 3,422,049, the contents of which are incorporated herein by reference. The autoclave was equipped with an agitator and a Strahman [trademark] valve to permit rapid discharge of the hot polymer dispersion into a 5 gallon stainless steel discharge tank which was connected to the reactor via a 1" diameter stainless steel line. The hot dispersion was rapidly discharged into this tank containing approximately 6.5 liters of 20°–23° C. water at the completion of each run. The hot dispersion was introduced below the surface of the water. The autoclave agitator used had three, six-bladed, impellers and was driven by a 2 HP DC variable speed motor.

The powder produced in this operation was analyzed using laser light scattering to measure the size distribution thereof by volume. This technique used the principle of diffraction of the particles as the measurement means. A Model 2600C Malvern Particle Size Analyzer with proper lens configuration for the expected particle size interfaced with a computer was used. It read the diffraction pattern and digitally performed the necessary integrations. For the powder analysis, water was charged to the water bath and circulated through the sample measuring chamber. After obtaining the baseline measurement, the agitator and sonic vibrator were activated and the copolymer powder was added to the water bath until the obscuration reading was 0.3. Mixing and circulation were controlled to obtain acceptable dispersion without excessive foaming. A drop of liquid detergent was added to facilitate dispersion. After eight minutes agitation, measurements were commenced and the size distribution data was automatically tabulated. The cumulative volume undersize and volume frequency was tabulated for 32 size classes together with useful derived parameters. A logarithmic plot was also produced. Duplicate runs were made for each copolymer powder sample. The particle size reported in the examples was the median diameter D(v,0.5) for the volume distribution curve. The range reported in the examples was for 80 percent of the volume distribution curve, i.e., from D(v,0.1) to D(v,0.9). In other words, ten percent of the powder particles were sized below the recited lower limit and 10 percent of the powder particles were larger than the upper recited particle size limit. This range provides a convenient means of comparing powders.

Following the procedure of Example I of U.S. Pat. No. 3,422,049, a particulate microfine support was produced from an ethylene-methyl acrylate copolymer containing 16.5 wt. % methyl acrylate having a density of 0.939, a melt index of 6.0, a melting point, as determined by Differential Scanning Colorimetry using the procedures of ASTM Test Procedures D-3417 and D-3418, of 86° C., and a VICAT Softening Point, as determined by ASTM Test Procedure D-155, Condition B, of 57° C.

In the above powder preparation, 450 grams of the copolymer was combined with 180 grams dispersing agent (Pluronic® F-98) and 810 grams water. The reactor was sealed, heated and when the temperature reached about 210° C. agitation (about 3200–3340 rpm) was commenced.

The powder thus prepared had a median particle size, D(v,0,5) of about 32.4 microns and a particle size range (in microns for 80% of the volume distribution curve) of about 14.3–61.6 microns. Furthermore, the EMA support prepared from the above procedure was a free-flowing powder comprised of discrete particles having spherical morphology, i.e., the individual particles were spherical or substantially spherical in shape.

The EMA copolymer support used in the following examples was also more fully characterized and was found to have a surface area of about 2.1 $m^2/g$, a pore volume of 0.021 cc/g and an average pore radius of 203 Å as determined by the Brunauer, Emmett, Teller (BET) method. These measurements were carried out using an AUTOSORB-6 [trademark] instrument and the physical measurements were determined using techniques described in S. Lowel et al., "Powder Surface Area and Porosity", 2nd Ed., Chapman and Hall, London, 1984. Furthermore, the copolymer support had a weight average molecular weight ($M_w$) of 110,400, number average molecular weight ($M_n$) of 24,700 and MWD ($M_w/M_n$) of 4.50.

Additionally, a particulate support was obtained by cryogenically grinding EMA. Cryogenic grinding of this sample was conducted by mechanical means, using a Wiley mill which was equipped with a recirculating refrigerant. The polymer sample, i.e. EMA, was ground along with dry ice so as to not incur polymer melting. The polymer was also ground so as to pass through a 20 mesh screen size. The resulting ground powder has an average particle size of about 590 microns and a particle size distribution of about 297 to about 840 microns.

The microfine EMA copolymer support and the cryogenic ground support were employed in the preparation of the supported tethered metallocene catalysts in the examples which follow.

PREPARATION OF SUPPORTED TETHERED METALLOCENE CATALYSTS AND POLYMERIZATIONS

EXAMPLE I

To illustrate the preparation of a supported metallocene catalyst of the instant invention, five (5.0) grams of the ground EMA support material prepared above was slurried with 75 ml dry THF under a nitrogen atmosphere in a 250 ml round-bottom Schlenk flask equipped with a stirring bar. One (1.0) ml of 2.0M sodium cyclopentadienylide (NaCp) in THF (2.0 mmol) was added via syringe to the slurry under $N_2$ at room temperature. The above reaction proceeded for about 72 hours, at which time a purple-red color was noted on the EMA support. Without wishing to be bound by any theory, this purple-red color is believed to be attributed to the electron-delocalized complex, i.e. the intermediate, formed upon bonding to the EMA.

To illustrate that a complex was formed on the EMA support, the intermediate was analyzed using a Nicole 60SXR FTIR. Upon spectral subtraction of the EMA support, a small peak at $1650$ $cm^{-1}$ corresponding to a carbonyl stretch was identified. This stretch was in agreement with values reported in the literature for related keto-cyclopentadienides, and thus suggested that a unique carbonyl species, i.e. a keto-cyclopentadienide intermediate, had been formed on the polymer backbone.

The intermediate ("EMA/NaCp"), was isolated, washed free of excess NaCp with heptane, and then dried in vacuo. The dried intermediate was then reslurried in fresh THF.

A THF solution of $ZrCl_4(THF)_2$ (0.377 g; 0.999 mmol) was added via cannula at a target loading of about 0.2 mmol Zr/g EMA. The reaction proceeded for about two hours after which the product was filtered and washed with fresh THF (100 ml) to remove any unreacted $ZrCl_4$ and possibly any unbound $Cp_2ZrCl_2$. The washed product was then dried in vacuo to give a metallocene catalyst supported through one or both of its cyclopentadienyl rings.

Analysis of the metallocene catalyst revealed that the catalyst contained 0.56% Zr (0.06 mmol Zr/g EMA).

The catalyst was used to prepare ethylene homopolymers. The polymerization was conducted in a one liter autoclave reactor which was charged with 500 ml dried, deoxygenated isobutane. Hydrogen was added to control the molecular weight and a modified methylaluminoxane, obtained from Texas Alkyls as a 2.24M Al concentrated solution in heptane (MMAO-3A), was used as the cocatalyst. The details of the polymerization conditions as well as the characteristics of the resins produced are provided in Table 1.

EXAMPLE II

A supported metallocene catalyst containing the ground EMA support of Example I was prepared as follows:

4.06 grams of ground EMA was placed in a 250 ml roundbottom Schlenk flask equipped with a stirbar and was thereafter slurried with 50 ml of dry THF. One (1.00) ml of 2.0M NaCp in THF (2.0 mmol) was added via syringe to the slurried EMA while under nitrogen and at room temperature and the reaction was allowed to proceed with stirring for 72 hours. Over the course of the reaction time, the solution and ultimately the polymer took on a purple color. Once the reaction was completed, the THF was removed in vacuo to the point where the polymer was clumpy, but had excess THF. Approximately 200 ml of heptane was then added, the slurry was stirred briefly, then settled. A brackish brown supernatant was decanted off via cannula and discarded. The treated polymer was washed a second time with 200 ml heptane and decanted. A golden brown material remained which was dried in vacuo.

The remaining golden brown material was slurried once again in THF, then a solution of 0.105 g $CpZrCl_3$ (0.4 mmol) in 50 ml THF was added to the slurry. In the first 10 minutes, after addition, both the polymer and the solution changed to a wheaten yellow color. The reaction was concentrated down to approximately 25 ml THF and then was stirred overnight at room temperature. The THF was filtered off, then the remaining catalyst was washed twice with 30 ml of heptane and dried in vacuo to give a metallocene catalyst supported through a bridge to only one cyclopentadienyl ring. 2.7 Grams of a light caramel colored powder was recovered. Analysis revealed that the catalyst contained 0.53% Zr (0.058 mmolZr/g).

The catalyst was used to polymerize ethylene. The details of the polymerization in isobutane are provided in Table 1 whereas the polymerization data in toluene are tabulated in Table 2.

EXAMPLE III

A supported metallocene catalyst containing the aforementioned particulate microfine EMA copolymer support was prepared and used for the polymerization of ethylene in this example. Specifically, the supported metallocene catalyst was prepared as follows:

5.2 grams of the particulate microfine EMA support, was placed in a 250 ml roundbottom Schlenk flask equipped with an egg-shaped stirbar and was slurried with 75 ml of dry THF. Two (2.00) ml of 2.0M NaCp in THF (4.0 mmol) was added via syringe to the slurried EMA, while under nitrogen and at room temperature, and the reaction was allowed to proceed with stirring for 4 days. Over the course of the reaction the solution and ultimately the polymer took on a caramel color. Once complete, the THF was filtered without prior reduction of volume. The polymer was washed once with heptane, filtered, then dried in vacuo to produce a grayish-purple powder.

The dried intermediate was again slurried in a 20 ml of THF, then a solution of 0.153 grams $CpZrCl_3$ (0.582 mmol) in 30 ml of THF was added to the slurry. Upon addition of the solution, the polymer reverted to a caramel color. The reaction was stirred overnight at room temperature, then was filtered. The powder was washed twice with heptane and dried in vacuo. 4.53 Grams of a light purple-grey powder was recovered.

The resulting catalyst contained 0.44% Zr (0.048 mmol Zr/g). The polymerization details are tabulated in Table 1.

EXAMPLE IV

A supported metallocene catalyst containing the particulate microfine EMA support material was prepared as follows:

5.0 grams of particulate microfine EMA support was placed in a 250 ml roundbottom Schlenk flask equipped with stirbar and was slurried with 75 ml of dry THF. 4.50 ml of 2.0M NaCp in THF (9.0 mmol) was added via syringe to the slurried EMA while under nitrogen and at room temperature. The reaction was allowed to proceed with stirring for 4 days. Over the course of the reaction, the solution and ultimately the polymer took on a purple color. After the 4 days, THF was removed in vacuo. The polymer was washed with 50 ml of fresh THF and filtered, leaving a grayish-purple powder.

The dried intermediate was again slurried in 50 ml of THF, then a solution of 1.0 grams $ZrCl_4(thf)_2$ (2.65 mmol) in 50 ml of THF was added to the slurry. Upon addition of the solution, the polymer changed to a flaxen-yellow color. The reaction was stirred for one hour at room temperature, then the THF was filtered off, leaving a grayish polymer powder. The filtrate, which had a yellowish tint, was discarded. The powder was washed once with heptane, then filtered and dried in vacuo. 4.80 Grams of a light purple-grey powder were recovered.

The catalyst contained 0.72% Zr (0.079 mmol Zr/g).

TABLE 1

Slurry Polymerization Results with Isobutane

|  | I | I | II | III |
|---|---|---|---|---|
| Catalyst wt. (g) | 0.33 | 0.34 | 0.15 | 0.36 |
| $H_2$ (mmol) | 4 | 4 | 4 | 4 |
| Rx Temp. (°C.) | 90 | 70 | 70 | 90 |
| Rx Pressure (psig) | 550 | 500 | 450 | 500 |
| Al/Zr | 2200 | 2100 | 6400 | 1300 |
| Time (min) | 60 | 60 | 30 | 60 |
| Activity (g/g cat · hr) | 479 | 360 | 1196 | 171 |
| MI[1] | 1.26 | 0.32 | 0.239 | 1.11 |
| MIR[2] | 24.3 | 27.9 | 30.46 | 33.2 |
| MW[3] | 70,700 | 110,200 | 105,200 | 190,790 |
| MWD[4] | 2.4 | 2.7 | 3.0 | 5.6 |

[1]Determined by ASTM D-1238, Condition E, reported as g/10 minutes.
[2]Determined by flotation in a density gradient column after annealing an extrudate sample for 30 minutes at 100° C. to approach equilibrium crystallinity.
[3]Weight average molecular weight determination was made using a Waters GPC on a mixed sized, crosslinked divinylbenzene column with 1,2,4-trichlorobenzene as a solvent at 135° C. with a refractive index detector.
[4]The ratio of Mw vs Mn, i.e., MWD, was also determined by GPC.

TABLE 2

Slurry Polymerization Results in Toluene

|  | II | II | II |
|---|---|---|---|
| Catalyst wt. (g) | 0.18 | 0.17 | 0.16 |
| $H_2$ (mmol) | 4 | 4 | 4 |
| Rx Temp. (°C.) | 70 | 70 | 90 |
| Rx Pressure (psig) | 200 | 400 | 200 |
| Al/Zr | 5333 | 2259 | 2400 |
| Time (min) | 60 | 60 | 60 |
| Activity (g/g cat · hr) | 1092 | 653 | 679 |
| MI[1] | 1.91 | 0.73 | 23.86 |
| MIR[2] | 18.9 | 17.8 | NA |
| MW[3] | 85,800 | 128,800 | 50,600 |
| MWD[4] | 2.4 | 2.3 | 1.8 |

[1]Determined by ASTM D-1238, Condition E, reported as g/10 minutes.
[2]Determined by flotation in a density gradient column after annealing an extrudate sample for 30 minutes at 100° C. to approach equilibrium crystallinity.
[3]Weight average molecular weight determination was made using a Waters GPC on a mixed sized, crosslinked divinylbenzene column with 1,2,4-trichlorobenzene as a solvent at 135° C. with a refractive index detector.
[4]The ratio of Mw vs Mn, i.e., MWD, was also determined by GPC.

What is claimed is:

1. A supported metallocene catalyst useful for polymerizing olefins comprising the product which is prepared by the steps of:

(a) reacting a particulate olefin copolymer support which comprises discrete particles having a median particle size ranging from about 1 up to about 1500 microns, a pore volume of less than 0.1 cc/g and a surface area of less than about 15 m²/g, wherein said olefin copolymer has a melt index of from about 0.1 to about 400 and includes from about 50.1 to about 99.9 weight percent $C_{2-3}$ α-olefin and from about 0.1 to about 49.9 weight percent of an acrylate, with a metallated compound, wherein said metallated compound is selected from the group consisting of a substituted or unsubstituted cyclopentadienylide, a substituted or unsubstituted indenylide and a substituted or unsubstituted fluorenylide compound and contains a metal of Groups I–III of the Periodic Table of Elements, under conditions sufficient to form a metallated keto-intermediate;

(b) contacting said metallated keto-intermediate of step (a) with a transition metal compound having the formula $(Cp)_a MR''_b X_c$ wherein Cp is a substituted or unsubstituted cyclopentadienyl, indenyl or fluorenyl ring; M is a metal of Group IVB, VB and VIB of the Periodic Table of Elements; R'' is a hydride, a hydrocarbyl group having from about 1 to about 20 carbon atoms, an alkoxy group having from about 1 to about 12 carbon atoms, a substituted or unsubstituted aryl group containing from about 6 to about 12 carbon atoms, or NR''', wherein R''' is an alkyl containing from about 1 to about 12 carbon atoms; X is a halide; a is 0 or 1; b is 0–4; c is 0–4; and the sum of a, b and c is equal to the oxidation state of M; and (c) recovering said contact product of step (b).

2. The supported metallocene catalyst of claim 1 wherein said acrylate has the formula:

$$\underset{CH_2=CRCOR'}{\overset{O}{\underset{\|}{}}}$$

wherein R is hydrogen or methyl and $R^1$ is an alkyl group having from about 1 to about 12 carbon atoms or an aryl group having from about 6 to about 12 carbon atoms.

3. The supported metallocene catalyst of claim 2 wherein R is hydrogen and $R^1$ is a $C_{1-4}$ alkyl group.

4. The supported metallocene catalyst of claim 3 wherein said acrylate is methyl acrylate.

5. The supported metallocene catalyst of claim 1 wherein said particles range in size from about 1 to about 1000 microns and the olefin copolymer contains from about 70 to about 99 weight percent $C_{2-3}$ α-olefin and from about 1 to about 30 weight percent of said acrylate.

6. The supported metallocene catalyst of claim 5 wherein said olefin copolymer contains from about 80 to about 95 weight percent ethylene and from about 5 to about 20 weight percent of said acrylate.

7. The supported metallocene catalyst of claim 1 wherein said olefin copolymer is selected from the group consisting of a copolymer of ethylene-methyl acrylate, a copolymer of ethylene-ethyl acrylate and a copolymer of ethylene-n-butyl acrylate.

8. The supported metallocene catalyst of claim 7 wherein said olefin copolymer is ethylene-methyl acrylate.

9. The supported metallocene catalyst of claim 1 wherein said support is a microfine powder comprised of particles which are spherical or substantially spherical in shape and has a median particle size ranging from about 1 to about 500 microns.

10. The supported metallocene catalyst of claim 9 wherein the median particle size of said support ranges from about 5 to about 300 microns.

11. The supported metallocene catalyst of claim 10 wherein the median particle size of said support ranges from about 20 to about 200 microns.

12. The supported metallocene catalyst of claim 1 wherein said metallated compound is a compound selected from the group consisting of sodium cyclopentadienylide, lithium cyclopentadienylide, potassium cyclopentadienylide, lithium pentamethylcyclopentadienylide, bis-(cyclopentadienyl) magnesium, bis-(cyclopentadienyl) calcium, cyclopentadienylthallium, sodium pentamethylcyclopentadienylide, sodium indenylide, lithium indenylide, sodium fluorenylide and lithium fluorenylide.

13. The supported metallocene catalyst of claim 12 wherein the metallated compound is sodium cyclopentadienylide.

14. The supported metallocene catalyst of claim 1 wherein from about 0.001 to about 10 mmol metallated compound per gram particulate olefin copolymer support is employed in step (a).

15. The supported metallocene catalyst of claim 14 wherein from about 0.01 to about 2.0 mmol metallated compound per gram particulate olefin copolymer support is employed in step (a).

16. The supported metallocene catalyst of claim 1 wherein steps (a) and (b) are carried out in an inert atmosphere in the presence of an ether solvent or an aromatic solvent.

17. The supported metallocene catalyst of claim 16 wherein said inert atmosphere is a $N_2$ or an Ar gas atmosphere.

18. The supported metallocene catalyst of claim 16 wherein said ether solvent is selected from the group consisting of tetrahydrofuran, dimethyl ether, diethyl ether, di-n-propyl ether, diisopropyl ether, di-n-butyl ether, divinyl ether, diallyl ether, diphenyl ether, dimethoxyethane and 1,4 dioxane.

19. The supported metallocene catalyst of claim 18 wherein said ether is tetrahydrofuran.

20. The supported metallocene catalyst of claim 1 wherein step (a) is conducted at a temperature of from about 0° C. to about 100° C. for a period of time of about 1 hr to about 5 days.

21. The supported metallocene catalyst of claim 20 wherein step (a) is conducted at a temperature of from about 15° C. to about 75° C. for a period of time of about 1 to about 4 days.

22. The supported metallocene catalyst of claim 21 wherein step (a) is conducted at a temperature of from about 20° C. to about 30° C. for up to about 3 days.

23. The supported metallocene catalyst of claim 1 wherein said intermediate of step (a) may optionally be washed and dried prior to performing step (b).

24. The supported metallocene catalyst of claim 1 wherein said transition metal compound is selected from the group consisting of titanium trichloride, titanium tetrachloride, zirconium tetrachloride, hafnium tetrachloride, (cyclopentadienyl)titanium trichloride, (cyclopentadienyl)zirconium trichloride, (cyclopentadienyl)hafnium trichloride, zirconium tetramethyl, zirconium tetramethoxy, zirconium tetraethoxy, titanium tetramethyl, titanium tetramethoxy, titanium teraethoxy, (cyclopentadienyl)zirconium tribromide, (cyclopentadienyl)zirconium trimethyl, (cyclopentadienyl)zirconium triphenyl, zirconium tetra((dimethyl)amide), zirconium tetra((diethyl)amide), cyclopentadienyl zirconium dimethylamide dichloride and (cyclopentadienyl)zirconium trimethoxy.

25. The supported metallocene catalyst of claim 24 wherein the transition metal compound is zirconium tetrachloride or cyclopentadienyl zirconium trichloride.

26. The supported metallocene catalyst of claim 1 wherein step (b) is conducted at a temperature of from about 0° C. to about 100° C. for a period of time up to about 5 days.

27. The supported metallocene catalyst of claim 26 wherein step (b) is conducted at a temperature of from about 15° C. to about 75° C. for a period of time of about 30 minutes to about 2 days.

28. The supported metallocene catalyst of claim 27 wherein step (b) is conducted at temperature of from about 20° C. to about 30° C. for up to about 24 hours.

29. The supported metallocene catalyst of claim 1 wherein said supported metallocene contains from about 0.01 up to about 10 weight percent of said transition metal, based on the total weight of said catalyst.

30. The supported metallocene catalyst of claim 29 wherein said supported metallocene catalyst contains from about 0.1 to about 2.0 weight % of said transition metal.

31. An alpha-olefin polymerization catalyst comprising the supported metallocene catalyst obtained in claim 1 and at least one cocatalyst compound, wherein said cocatalyst compound is a metal alkyl, a metal hydride, a metal alkylhydride or a metal alkylhalide containing a metal of Group IA, IIA, IIB, IIIB or IVB of the Periodic Table of Elements.

32. The alpha-olefin polymerization catalyst system of claim 31 wherein the cocatalyst is a cyclic or linear aluminoxane.

33. The alpha-olefin polymerization catalyst system of claim 32 wherein the cocatalyst is methylaluminoxane.

34. The alpha-olefin polymerization catalyst system of claim 31 wherein the cocatalyst is added in a molar ratio of about 1:1 to about 10,000:1 based on the transition metal compound of said catalyst.

35. The alpha-olefin polymerization catalyst system of claim 34 wherein the cocatalyst is added in a molar ratio of about 50:1 to about 5,000:1 based on the transition metal compound of said catalyst.

36. The alpha-olefin polymerization catalyst system of claim 31 further comprising a cocatalyst modifier, wherein said cocatalyst modifier is a halosilane, a halocarbon, an aromatic ester, an organometallic compound, an alkoxysilane or a phenylborate salt.

37. The alpha-olefin polymerization catalyst system of claim 36 wherein the cocatalyst modifier is a phenylborate salt.

38. The alpha-olefin polymerization catalyst system of claim 37 wherein the phenyl borate salt is triethylammonium tetraphenylborate, tri(n-butyl)ammonium tetraphenylborate, trimethylammoinium tetraphenylborate, dimethyldiphenylammonium tetraphenylborate, methylpyridinium tetraphenylborate, benzylpyridinium tetraphenylborate, trimethylsulfonium tetraphenylborate, triethylammonium tetrakis(pentafluorophenyl) borate, triphenylammonium tetrakis(pentafluorophenyl) borate, methyldiphenylammonium tetrakis(pentafluorophenyl) borate, anilinium tetrakis(pentafluorophenyl) borate, methylanilinium tetrakis(pentafluorophenyl) borate, dimethyl(m-nitroanilinium tetrakis(pentafluorophenyl) borate, pyridinium tetrakis(pentafluorophenyl) borate, N-methylpyridinium tetrakis(pentafluorophenyl) borate, trimethylsulfonium tetrakis(pentafluorophenyl) borate, tetraphenylphosphonium tetrakis(pentafluorophenyl) borate, triphenylphosphonium tetrakis(pentafluorophenyl) borate and hexafluoroarsenic acid triethylammonium.

39. A process for (co)-polymerizing α-olefins comprising polymerizing at least one $C_2$–$C_8$ α-olefin under polymerization conditions in the presence of the polymerization catalyst system of claim 31, wherein the cocatalyst is added in a molar ratio of about 1:1 to about 10,000:1 based on the transition metal compound of said catalyst.

40. The process of claim 39, wherein said α-olefin is (co)polymerized into a polymer or copolymer having substantially spherical particles whose median particle sizes range from about 10 to about 5000 microns.

* * * * *